(12) United States Patent
Hauser et al.

(10) Patent No.: US 8,057,884 B2
(45) Date of Patent: Nov. 15, 2011

(54) GLASS SEGMENTS INCLUDING IDENTIFICATION MARKING

(75) Inventors: Hubert Hauser, Wurselen (DE); Herbert Stadelmann, Aachen (DE); Andreas Kasper, Vaals (NL)

(73) Assignee: Saint-Gobain Glass France, Courbevoie (FR)

( * ) Notice: Subject to any disclaimer, the term of this patent is extended or adjusted under 35 U.S.C. 154(b) by 81 days.

(21) Appl. No.: 12/560,508

(22) Filed: Sep. 16, 2009

(65) Prior Publication Data

US 2010/0003476 A1    Jan. 7, 2010

Related U.S. Application Data

(62) Division of application No. 10/518,534, filed as application No. PCT/FR03/001953 on Jun. 25, 2003, now Pat. No. 7,615,253.

(30) Foreign Application Priority Data

Jul. 3, 2002    (DE) .................................. 102 29 833

(51) Int. Cl.
*B32B 3/00*    (2006.01)

(52) U.S. Cl. ..................... 428/195.1; 428/426; 428/409; 428/410

(58) Field of Classification Search .................. 428/426, 428/409, 410, 195.1
See application file for complete search history.

(56) References Cited

U.S. PATENT DOCUMENTS

| | | | |
|---|---|---|---|
| 4,503,437 A | 3/1985 | Katzschner |
| 4,661,305 A | 4/1987 | Carlomagno |
| 5,565,237 A | 10/1996 | Bartetzko |
| 5,684,515 A | 11/1997 | Ho |
| 6,037,041 A | 3/2000 | Van Kooyk et al. |
| 6,430,964 B1 | 8/2002 | Dauba et al. |
| 6,555,794 B2 | 4/2003 | Leutner et al. |
| 6,638,440 B1 | 10/2003 | Grimard |

FOREIGN PATENT DOCUMENTS

| | | |
|---|---|---|
| DE | 964 095 | 5/1957 |
| DE | 33 32 029 | 3/1984 |
| DE | 41 11 625 | 9/1991 |
| DE | 195 16 863 | 7/1996 |
| DE | 195 16 863 A1 | 7/1996 |
| DE | 200 20 984 | 6/2001 |
| EP | 0 433 137 | 6/1991 |
| FR | 2 787 061 | 6/2000 |
| JP | 57-129842 | 8/1982 |
| JP | 10-53733 | 2/1998 |
| WO | 00/02825 | 1/2000 |
| WO | 01/94128 | 12/2001 |

*Primary Examiner* — Gwendolyn Blackwell

(74) *Attorney, Agent, or Firm* — Oblon, Spivak, McClelland, Maier & Neustadt, L.L.P.

(57) ABSTRACT

A glass pane is provided. A marking field that includes an uneven surface structure is located on a limited area of a smooth side surface of the glass pane. The limited area is smaller than a total area of the side surface of the glass pane, and the uneven surface structure is more rough than portions of the side surface of the glass pane that are outside of the limited area of the side surface of the glass pane. A marking layer is located on the marking field so as to create an intimate adhesive bond between the marking layer and the marking field. The marking layer includes a color containing a thermochromic pigment that visually indicates that a heat treatment has been carried out on the glass pane by being irreversibly modified at a temperature at which the heat treatment is conducted.

27 Claims, 1 Drawing Sheet

GLASS SEGMENTS INCLUDING IDENTIFICATION MARKING

CROSS-REFERENCE TO RELATED APPLICATIONS

The present application is a division of application Ser. No. 10/518,534, filed on Dec. 30, 2004, which is a National Stage application of PCT/FR03/01953, filed Jun. 25, 2003 and claims benefit of priority to German application number 102 29 833.5, filed Jul. 3, 2002, the entire contents of each of which are incorporated herein by reference.

FIELD OF THE INVENTION

The invention relates heat-treated substrates, in particular tempered glass panes, that are marked.

DISCUSSION OF THE BACKGROUND

The initial characteristics stem from WO-A1-00/02825, which describes a method for marking glass panes after a heat treatment. According to a preferred application case mentioned in this description, tempered glass panes, that have undergone an aging test following the tempering operation, are provided with a local colored marking. This marking is produced by means of a special thermochromic organic color, that is applied locally, for example by screen printing, after the tempering but before the aging at a predetermined point on the surface of the pane, or alternatively on a thin film covering the latter.

It has been shown that, using the heat soaking test, tempered glass panes do not contain critical nickel sulfide inclusions. It is known that such inclusions can lead to sudden spontaneous fracture, with unpredictable consequences, during the life of the tempered glass panes. During the heat soaking test, in which the panes are heated to maximum temperatures of generally between 180 and 340° C., especially around 300° C., according to a predetermined time-temperature curve, panes break in a random fashion before they are mounted. The tempering of the panes has still not disappeared at these temperatures. In any case, this heat soaking test takes a great deal of time and necessarily incurs relatively high installation costs.

If the thermochromic color has been applied before the test, it undergoes a permanent change by an irreversible conversion of the color. Consequently, it is possible immediately to detect that the heat soaking test has been carried out on the completed, heat-tested/treated, tempered glass panes. Even very small residues of color may be clearly identified, by suitable methods, after the heat soaking test has been carried out.

For the application described here, thermochromic colors that contain the chemical compound iron (II, III) hexacyanoferrate as thermochromic pigment may be suitable. An example of such a commercially available pigment is "Mannox Blue 510". The color must exhibit good adhesion to the glass because of its composition.

Colored markings of this kind cannot be compared with inter alia an enamel. They cannot penetrate the surface of the glass or bond in a lasting manner thereto. On the contrary, it is possible in principle to remove them from the surface of the glass, completely and virtually without any trace, using a blade or steel wool after a heat soaking test. As a result, no reliable identification of the tested panes is possible or, put another way, it is not possible to exclude with certainty the fact that panes with no color mark have not undergone a heat soaking test. Thus, the indicative value of the color mark and the visible evidence of quality that stems therefrom are undesirably limited.

In addition, it should however not be possible to apply the marking color before the tempering, and produce the color change only by dint of the thermal tempering, without subsequently carrying out a heat soaking test. The aforementioned color loses all adhesion to the surface of the glass after the action of high temperatures substantially above 300° C., such as those necessary for tempering the glass (well above 600° C.), so that they can no longer be used for the marking.

Also known, from document DE-C1-3 940 749, is a method for the durable marking or printing of glass panes, in which, in a layer deposited by screen printing, local color changes are induced via which the individual characteristics of the pane in question are indelibly displayed. This occurs in the known method by the fact that a marking composed of an organic material (color or ink) is applied locally, in a predetermined design, on the surface of the pane before printing with the inorganic screen-printing paste. During the high-temperature baking of the subsequently applied screen-printing paste, the organic compounds volatilize. Thus, local perturbations, or even holes, appear in the organic coating and these are clearly perceptible visually. Modification or removal of these designs is possible only by simultaneously removing the baked inorganic coating.

It is also known (DE-C2-4 111 625 and EP-B1-0 281 351) to produce fine structures, in the form of striations or similar features, in coatings deposited on a substrate by screen printing. In the aforementioned cases, these local heterogeneities serve to improve the brazability of the screen-printing paste that is necessarily electrically conducting after the baking operation, or alternatively to improve the adhesion of the spots of braze.

SUMMARY OF THE INVENTION

The object of the invention is to propose a method for the visual marking of substrates undergoing a heat treatment, which ensures that the marking color cannot be mechanically removed from the surface of the substrate, in such a way that the substrate is permanently marked. The aim of the invention is also to propose a substrate, in particular a glass pane, provided with a marking according to the invention.

To prevent the marking layer, or alternatively the marking color, from being able to be removed by mechanical means, a marking field is produced on one surface of the substrate before the tempering. The substrate is provided with a surface structure that is distinguished from the usual (smooth) surface and causes, in particular, intimate adhesive bonding between the colored field and the marking layer applied to it and, if appropriate, even allows depthwise penetration of the latter.

The marking field may be produced by a local modification of the smooth surface of the substrate itself, by locally modifying the smooth surface so as to achieve particularly good adhesion of the thermochromic marking color, for example by a chemical and/or mechanical action (acid etching, sandblasting, grinding). In this case, small areas of unevenness or small hollows have to appear in the surface of the substrate, these not having a negative impact on the overall printing of the substrate but forming a very good base for depositing the marking, with the result that the latter can be removed only at great cost and almost always still leaving traces thereof.

An alternative approach lies in the deposition of an additional surface structure in the form of a coating to be baked, in particular during the heat tempering. The marking field thus formed also forms a surface that is finely porous or also appropriately structured, to which a marking color, on the one hand, adheres well, and it is practically impossible, on the other hand, to remove the color without leaving traces.

If a coating to be baked forms the marking field, it is then produced with a surface structure promoting adhesion and penetration of the thermochromic color, in the form of a structured pattern or design, which interrupts the coating that covers the surface. The prior art on screen printing, already discussed, describes possibilities of providing such a coating with interruptions, if necessary over the full thickness and therefore right down to the surface of the substrate. However, it is also possible to produce disordered or irregular structures.

The improved marking according to the invention may be produced in a particularly discreet manner and for a relatively low additional cost if the marking field is provided as part of a stamp for marking the substrate. Tempered glass panes are usually provided with the manufacturer's stamp, allowing it to be traced back to the actual manufacturer, to the place of manufacture, to the date of manufacture, etc. This zone may be put to a new use with an area/surface portion marked with a color.

If the marking field is produced by modifying the surface of the substrate itself, it is also possible to produce in this case a predetermined and reproducible identification mark using an "etching" stamp. Depending on the thickness of the substrate in question, for example a glass pane, this marking field may even be placed on the edge, therefore at a point that is scarcely visible. It is also possible in principle—for a higher cost—to apply a printed marking field on one edge of the pane.

The result is that fine, limited areas of unevenness (scratches, pits) appear locally in the marking field on the surface of the substrate, which at the same time have a rough internal surface compared with the rest of the surface of the substrate. The marking color to be applied fills these areas of unevenness and bonds to their rough surface.

Of course, several marking fields may also be provided on the same substrate and the two aforementioned embodiments may also be combined with each other.

Because of the intimate bonding between the marking layer and the structured surface of the subjacent marking field, it is consequently no longer possible to completely remove the color with a glass plane, a blade or other tools. Even by rubbing strongly with glass wool, residues of color could still be identified using a microscope. Likewise, it is still possible to determine without any problem, by analysis, what color was employed.

Nevertheless, if an unauthorized attempt was made to remove the marking in addition to the baked coating or the applied surface structure, this would in all cases leave clear traces on the surface of the substrate, which would make one suspect that the substrate in question had been manipulated.

Other details and advantages of the subject of the invention will be provided by the drawings of an illustrative example and by the following detailed description of the invention.

DETAILED DESCRIPTION OF THE PREFERRED EMBODIMENTS

Figure 1:
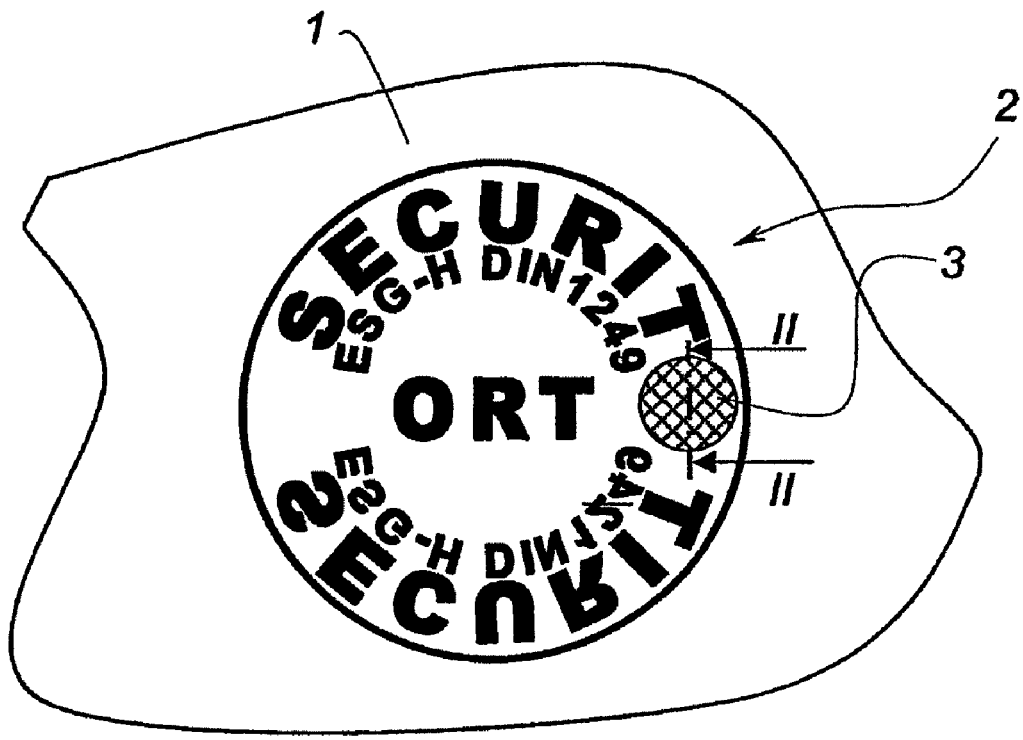
FIG. 1 shows one embodiment of a printed and baked manufacturer's stamp on a tempered glass pane, with a marking according to the invention.

In FIG. 1, a manufacturer's stamp 2 is printed and baked on a surface of a tempered glass pane 1 illustrated only by a fragment. It gives firstly the place of manufacture and possibly a trademark of the manufacturer. Furthermore, the stamp 2 indicates that it is a tempered monolithic glass. ESG stands for tempered safety glass, "H" means that a heat soaking test was carried out and the stamp also indicates the corresponding DIN standard.

According to the invention, an additional marking field 3 has been added to the stamp, which area will be discussed in greater detail in relation to FIG. 2.

It should straight away be pointed out that this additional marking field 3 does not necessarily have to be joined to the stamp 2, unlike the illustration given by way of example, rather it may also be placed at any other point on the surface of the glass pane, and even on the edge. However, the arrangement shown here appears to be the most useful, because the stamp 2 must be visually inspected without difficulty during any removal and thus, at the same time, the marking 3 may also be identified.

Figure 2:
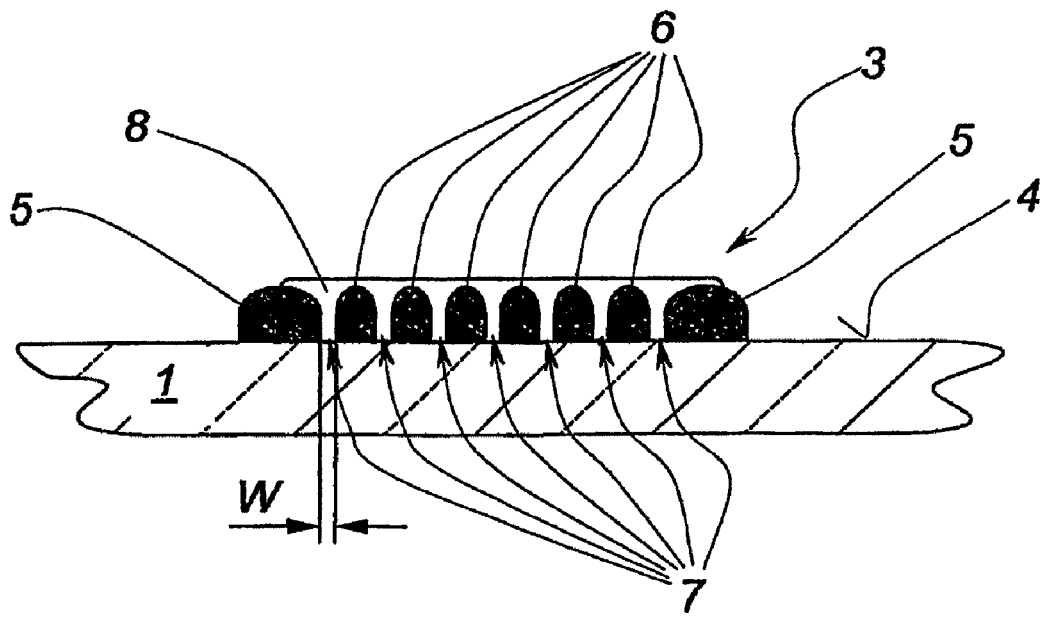
FIG. 2 shows an enlarged cross-sectional view, on no particular scale, taken along the line II-II of FIG. 1, through the marking zone.

As may be seen in the enlarged cross section of FIG. 2, the marking field 3 is essentially composed of a flat element 5, consisting of an appropriate paste to be baked, applied during the same operation as the stamp 2 to the surface 4 of the glass pane 1. The element 5 in this case is in the form of a grid pattern surrounded by a circular line, with ribs 6, as already illustrated in FIG. 1. The ribs 6 project by about 5 to 35 μm above the surface of the glass and each time define intermediate spaces 7, at the bottom of which the surface of the glass may be bare.

Deposited on the surface covered by the element 5 is a paint of a thermochromic color 8, which has penetrated the intermediate spaces 7 but which has also covered or which may cover the upper faces of the ribs 6 of the grid pattern. The intermediate spaces 7 must be large enough to allow the color 8 to penetrate, but small enough to ensure that simple tearing with mechanical tools is prevented. From the standpoint of the manufacturing technique, intermediate spaces with a width W of, for example, 0.5 to 0.7 mm do not cause problems. The height of the element 5 above the surface of the substrate is therefore shown here in a much too large size compared with the width of the intermediate spaces.

As regards the objective of the invention, it is not absolutely necessary for the color 8 to penetrate right to the surface of the glass. As already mentioned above, it is sufficient to prevent unauthorized complete removal, without residues and without traces, of the base of the element 5. Given that flat screen-printing elements have a certain porosity after baking, it would even be conceivable to provide the element 5 in the form of continuous spots or of a continuous base for depositing the thermochromic color, which could be permanently set in the pores of the said spots or base. However, it is preferable here to have a grid pattern, because it favors defined deposition of the thermochromic color 8 both in terms of shape and quantity. This contributes to the mechanization of the colored marking in an in-line industrial process before the heat soaking test is carried out and thus it further lowers the costs thereof.

What is claimed is:

1. A glass pane that is tempered and then heat-treated, comprising:
a marking field that includes an uneven surface structure and that is located on a limited area of a smooth side surface of the glass pane, the limited area being smaller than a total area of the side surface of the glass pane, and the uneven surface structure being more rough than portions of the side surface of the glass pane that are outside of the limited area of the side surface of the glass pane; and
a marking layer located on the marking field such that the marking layer penetrates intermediate spaces or hollows within the marking field so as to create an intimate adhesive bond between the marking layer and the marking field,
wherein the marking layer includes a color containing a thermochromic pigment that is irreversibly modified at a temperature at which a heat treatment is conducted, so as to visually indicate that the heat treatment has been conducted on the glass pane, and
wherein the uneven surface structure of the marking field is discontinuous such that bare portions of the side surface of the glass pane are exposed to the marking layer.

2. The glass pane as claimed in claim 1, wherein the marking field includes hollows formed in the side surface of the glass pane.

3. The glass pane as claimed in claim 1, wherein the marking field includes a coating that is positioned on the side surface of the glass pane with defined open intermediate spaces into which the marking layer penetrates.

4. The glass pane as claimed in claim 1, wherein the marking field comprises a portion of a marking stamp provided on the side surface of the glass pane.

5. The glass pane as claimed in claim 1, wherein the marking field is a coating that is positioned on the side surface of the glass pane in a grid pattern.

6. The glass pane as claimed in claim 5, wherein the coating forms part of a manufacturer's mark affixed to the side surface of the glass pane.

7. A glass pane as claimed in claim 5, wherein the coating comprises a grid of intersecting ribs with intermediate spaces that extend to the side surface of the glass pane.

8. A glass pane that is tempered and then submitted to a heat-soak test, comprising:
a marking field on a local portion of a surface of a side of the glass pane, the marking field including an uneven surface structure, the local portion of the surface of the side of the glass pane being a limited surface area on the side of the glass pane that is smaller than a total surface area of the side of the glass pane; and
a marking color positioned on said marking field so as to produce a marking layer, the marking color filling said uneven surface structure so as to create an intimate adhesive bond between the marking layer and the marking field,
wherein the marking color is a thermochromic pigment that is irreversibly modified by the heat-soak test, and
wherein the uneven surface structure of the marking field is discontinuous such that bare portions of the side surface of the glass pane are exposed to the marking color.

9. The glass pane as claimed in claim 8, wherein the marking field includes hollows formed in the surface of the side of the glass pane.

10. The glass pane as claimed in claim 8, wherein the marking field includes a coating that is positioned on the surface of the side of the glass pane with defined open intermediate spaces that are filled with the marking color.

11. The glass pane as claimed in claim 8, wherein the marking field comprises a portion of a marking stamp provided on the surface of the side of the glass pane.

12. The glass pane as claimed in claim 8, wherein the marking field is a coating that is arranged on the surface of the side of the glass pane in a grid pattern.

13. The glass pane as claimed in claim 12, wherein the coating forms part of a manufacturer's mark affixed to the surface of the side of the glass pane.

14. A glass pane as claimed in claim 12, wherein the coating comprises a grid of intersecting ribs with intermediate spaces that extend to the surface of the side of the glass pane.

15. A tempered glass pane, comprising:
a first face and a second face;
a marking field located on a surface of said first face of said glass pane, the marking field including an uneven surface that is more rough than portions of the surface of said first face that are not within said marking field; and
a marking layer of thermochromic marking color deposited on said marking field such that the marking layer penetrates intermediate spaces or hollows within the marking field so as to create an intimate adhesive bond between the marking layer and the marking field,
wherein the thermochromic marking color is a pigment that is irreversibly modifiable by a heat treatment of the glass pane, and
wherein the uneven surface of the marking field is discontinuous such that bare portions of the surface of the first face of the glass pane are exposed to the marking layer.

16. The tempered glass pane as claimed in claim 15, wherein said marking field includes areas of unevenness or hollows that extend into the surface of said first face.

17. The tempered glass pane as claimed in claim 15, wherein said marking field includes an additional surface structure that includes a plurality of intermediate spaces on a local portion of the surface of said first face of said glass pane.

18. The tempered glass pane as claimed in claim 15, wherein said marking field includes a coating that is located on the said first face of said glass pane and that comprises a grid of intersecting ribs with intermediate spaces that extend to the side surface of the glass pane.

19. A tempered glass pane, comprising:
a first face and a second face;
a marking field located on a surface of said first face of said glass pane, the marking field including an uneven surface that is more rough than portions of the surface of said first face that are not within said marking field; and
a marking layer of thermochromic marking color deposited on said marking field such that the marking layer penetrates intermediate spaces or hollows within the marking field so as to create an intimate adhesive bond between the marking layer and the marking field,
wherein the thermochromic marking color is a pigment that is irreversibly modified by a heat treatment of the glass pane, and
wherein the uneven surface of the marking field is discontinuous such that bare portions of the surface of the first face of the glass pane are exposed to the marking layer.

20. The tempered glass pane as claimed in claim 19, wherein said marking field includes areas of unevenness or hollows that extend into the surface of said first face.

21. The tempered glass pane as claimed in claim 19, wherein said marking field includes an additional surface structure that includes a plurality of intermediate spaces on a local portion of the surface of said first face of said glass pane.

22. The tempered glass pane as claimed in claim 19, wherein said marking field includes a coating that is located on the said first face of said glass pane and that comprises a grid of intersecting ribs with intermediate spaces that extend to the surface of said first face of the glass pane.

23. The glass pane as claimed in claim 1, wherein the uneven surface structure of the marking field projects from the side surface of the glass pane to a height ranging from 5 to 35 µm.

24. The glass pane as claimed in claim 1, wherein the intermediate spaces or hollows in the marking field have a width ranging from 0.5 to 0.7 mm.

25. A glass pane that is tempered and then heat-treated, comprising:
   a marking field that includes an uneven surface structure and that is located on a limited area of a smooth side surface of the glass pane, the limited area being smaller than a total area of the side surface of the glass pane, and the uneven surface structure being more rough than portions of the side surface of the glass pane that are outside of the limited area of the side surface of the glass pane; and
   a marking layer located on the marking field such that the marking layer penetrates intermediate spaces or hollows within the marking field so as to create an intimate adhesive bond between the marking layer and the marking field,
   wherein the marking layer includes a color containing a thermochromic pigment that is irreversibly modified at a temperature at which a heat treatment is conducted, so as to visually indicate that the heat treatment has been conducted on the glass pane,
   wherein the intermediate spaces or hollows in the marking field have a width ranging from 0.5 to 0.7 mm.

26. A glass pane that is tempered and then heat-treated, comprising:
   a marking structure including a backed coating having a non-planar first surface and a planar second surface, the marking structure being disposed such that the planar second surface abuts a portion of a smooth side surface of the glass pane, the non-planar first surface being more rough than the side surface of the glass pane; and
   a marking layer disposed on the marking structure such that the marking layer penetrates intermediate spaces or hollows within the non-planar first surface of the marking structure and an intimate adhesive bond exists between the marking layer and the marking structure,
   wherein the marking layer includes a color containing a thermochromic pigment that is irreversibly modified at a temperature at which a heat treatment is conducted, so as to visually indicate that the heat treatment has been conducted on the glass pane.

27. A glass pane that is tempered and then heat-treated, comprising:
   a marking field including a backed coating and an uneven surface structure, the marking field being located on a limited area of a smooth side surface of the glass pane, the limited area being smaller than a total area of the side surface of the glass pane, and the uneven surface structure being more rough than portions of the side surface of the glass pane that are outside of the limited area of the side surface of the glass pane, the backed coating being deposited on the smooth side surface; and
   a marking layer located on the marking field such that the marking layer penetrates intermediate spaces or hollows within the marking field so as to create an intimate adhesive bond between the marking layer and the marking field,
   wherein the marking layer includes a color containing a thermochromic pigment that is irreversibly modified at a temperature at which a heat treatment is conducted, so as to visually indicate that the heat treatment has been conducted on the glass pane.

\* \* \* \* \*